(12) United States Patent
Kim et al.

(10) Patent No.: US 11,476,519 B2
(45) Date of Patent: Oct. 18, 2022

(54) METHOD FOR MANUFACTURING BATTERY MODULE

(71) Applicant: LG Chem, Ltd., Seoul (KR)

(72) Inventors: Soo-Youl Kim, Daejeon (KR); Jae-Hun Yang, Daejeon (KR); Han-Jong Yoon, Daejeon (KR); Jae-Min Lee, Daejeon (KR); Hae-Ryong Jeon, Daejeon (KR); Young-Ho Choi, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/158,320

(22) Filed: Jan. 26, 2021

(65) Prior Publication Data

US 2021/0151820 A1 May 20, 2021

Related U.S. Application Data

(63) Continuation of application No. 16/095,814, filed as application No. PCT/KR2017/014584 on Dec. 12, 2017.

(30) Foreign Application Priority Data

Jan. 17, 2017 (KR) .................. 10-2017-0008279

(51) Int. Cl.
  *H01M 10/6567* (2014.01)
  *H01M 10/613* (2014.01)
  *H01M 10/656* (2014.01)
  *H01M 50/20* (2021.01)

(52) U.S. Cl.
  CPC ..... *H01M 10/6567* (2015.04); *H01M 10/613* (2015.04); *H01M 10/656* (2015.04); *H01M 50/20* (2021.01); *H01M 2220/20* (2013.01)

(58) Field of Classification Search
  CPC .......... H01M 10/6567; H01M 10/656; H01M 10/613
  See application file for complete search history.

(56) References Cited

U.S. PATENT DOCUMENTS

| | | | |
|---|---|---|---|
| 2002/0085355 | A1 | 7/2002 | Oda et al. |
| 2003/0215702 | A1 | 11/2003 | Tanjou et al. |
| 2008/0318121 | A1 | 12/2008 | Takagi |
| 2011/0274951 | A1 | 11/2011 | Yasui et al. |

(Continued)

FOREIGN PATENT DOCUMENTS

| | | |
|---|---|---|
| CN | 1351387 A | 5/2002 |
| CN | 105304838 A | 2/2016 |

(Continued)

OTHER PUBLICATIONS

Chinese Search Report for Application No. 2017800192516, dated Nov. 4, 2020, 3 pages.

(Continued)

*Primary Examiner* — Amanda C. Walke
(74) *Attorney, Agent, or Firm* — Lerner, David, Littenberg, Krumholz & Mentlik, LLP

(57) ABSTRACT

A method for manufacturing a battery module includes accommodating a battery cell assembly having at least one battery cell in a module case, and injecting a thermally conductive adhesive through at least one injection hole provided in a bottom portion of the module case so that the module case is coated with the thermally conductive adhesive.

13 Claims, 6 Drawing Sheets

(56) References Cited

U.S. PATENT DOCUMENTS

| | | |
|---|---|---|
| 2014/0363710 A1 | 12/2014 | Lee et al. |
| 2016/0028131 A1 | 1/2016 | Lee |
| 2016/0149174 A1 | 5/2016 | Okura |
| 2016/0149175 A1 | 5/2016 | Morimitsu et al. |
| 2016/0197386 A1 | 7/2016 | Moon et al. |
| 2017/0244074 A1 | 8/2017 | Matsui |
| 2018/0076493 A1 | 3/2018 | Park et al. |
| 2019/0044201 A1 | 2/2019 | Jo et al. |
| 2019/0051954 A1 | 2/2019 | Kim et al. |
| 2020/0106143 A1 | 4/2020 | Juzkow |
| 2020/0185797 A1 | 6/2020 | Park et al. |

FOREIGN PATENT DOCUMENTS

| | | |
|---|---|---|
| CN | 105493309 A | 4/2016 |
| CN | 105633313 A | 6/2016 |
| CN | 105633315 A | 6/2016 |
| CN | 107431147 A | 12/2017 |
| JP | H06275246 A | 9/1994 |
| JP | 2004111098 A | 4/2004 |
| JP | 201590758 A | 5/2015 |
| JP | 2017079184 A | 4/2017 |
| KR | 100776767 B1 | 11/2007 |
| KR | 20130061895 A | 6/2013 |
| KR | 20150025236 A | 3/2015 |
| KR | 20150049598 A | 5/2015 |
| KR | 20160034676 A | 3/2016 |
| KR | 20160097013 A | 8/2016 |
| KR | 20160105354 A | 9/2016 |
| KR | 20160105355 A | 9/2016 |
| KR | 20160133776 A | 11/2016 |

OTHER PUBLICATIONS

Feng, X et al., "A 3D thermal runaway propagation model for a large format lithium ion battery module", Energy 115, Sep. 12, 2016, pp. 194-208.

Wang Bing, "Battery Electric Vehicle Battery Package Design", Shanghai Electric Technology Edition 1674-540X (2016), 9(1), pp. 037-039, 048, English Abstract provided.

English Translation of Written Opinion for Korean Application No. 20160024317 dated Jul. 9, 2020 for U.S. Appl. No. 16/095,814; 6 pages.

International Search Report for Application No. PCT/KR2017/014581, dated Apr. 16, 2018, 2 pages.

International Search Report for Application No. PCT/KR2017/014584 dated Apr. 16, 2018.

Search Report from Chinese Office Action for Application No. 201780030033.2 dated Dec. 2, 2020; 2 pgaes.

METHOD FOR MANUFACTURING BATTERY MODULE

CROSS-REFERENCE TO RELATED APPLICATIONS

The present application is a continuation of U.S. patent application Ser. No. 16/095,814, filed on Oct. 23, 2018, which is a national phase entry under 35 U.S.C. § 371 of International Application No. PCT/KR2017/014584 filed Dec. 12, 2017, published in Korean, which claims priority from Korean Patent Application No. 10-2017-0008279 filed on Jan. 17, 2017 in the Republic of Korea, all of which are incorporated herein by reference.

TECHNICAL FIELD

The present disclosure relates to a method for manufacturing a battery module.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

In the case of the conventional battery module, the technology for efficiently cooling the heat generated at the battery cells is becoming more and more important as the demanded battery capacity is increasing.

For the efficient cooling, in the conventional battery module, a thermally conductive adhesive is applied to the inside of a module case to stably fix a battery cell assembly including at least one battery cell in the module case and to improve thermal conductivity.

However, in the conventional battery module, when an injection hole for injecting the thermally conductive adhesive into the module case is formed, the battery cell assembly in the module case may be damaged due to burr or the like, or an injection nozzle for injecting the thermally conductive adhesive may not be accurately inserted into the injection hole, or the thermally conductive adhesive may leak out of the module case.

DISCLOSURE

Technical Problem

The present disclosure is designed to solve the problems of the related art, and therefore the present disclosure is directed to providing a method for manufacturing a battery module, which may enhance the thermally conductive adhesive injecting efficiency and prevent a battery cell assembly from being damaged, in a battery module that is cooled using the thermally conductive adhesive.

Technical Solution

In one aspect of the present disclosure, there is provided a method for manufacturing a battery module, comprising: accommodating a battery cell assembly having at least one battery cell in a module case; and injecting a thermally conductive adhesive through at least one injection hole provided in a bottom portion of the module case so that the module case is coated with the thermally conductive adhesive.

The method for manufacturing a battery module may further include arranging the module case in a horizontal direction, before the thermally conductive adhesive is injected.

The at least one injection hole may be provided at a middle region of the bottom portion of the module case.

The method for manufacturing a battery module may further include arranging the module case in a vertical direction, before the thermally conductive adhesive is injected.

The at least one injection hole may be provided at one side rim region of the bottom portion the module case.

The injection hole may be provided in plural, and the plurality of injection holes may be spaced apart from each other by a predetermined distance at the bottom portion of the module case.

Convex portions and concave portions may be formed alternately at an inner surface of the bottom portion of the module case, and the plurality of injection holes may be provided in the convex portions.

The convex portions and the concave portions may have a rounded shape.

The plurality of injection holes may have an inclined chamfer portion at one side thereof.

The plurality of injection holes may have different spacing distances in an outer direction from the center of the bottom portion of the module case.

Advantageous Effects

According to various embodiments as above, it is possible to provide a method for manufacturing a battery module, which may enhance the thermally conductive adhesive injecting efficiency and prevent a battery cell assembly from being damaged, in a battery module that is cooled using the thermally conductive adhesive.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
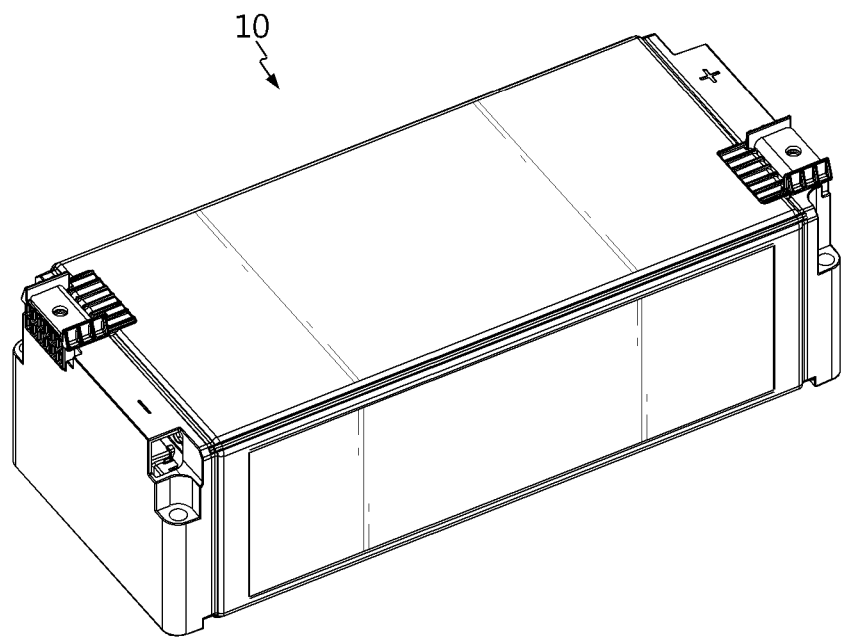
FIG. 1 is a diagram for illustrating a battery module according to an embodiment of the present disclosure.
Figure 2:
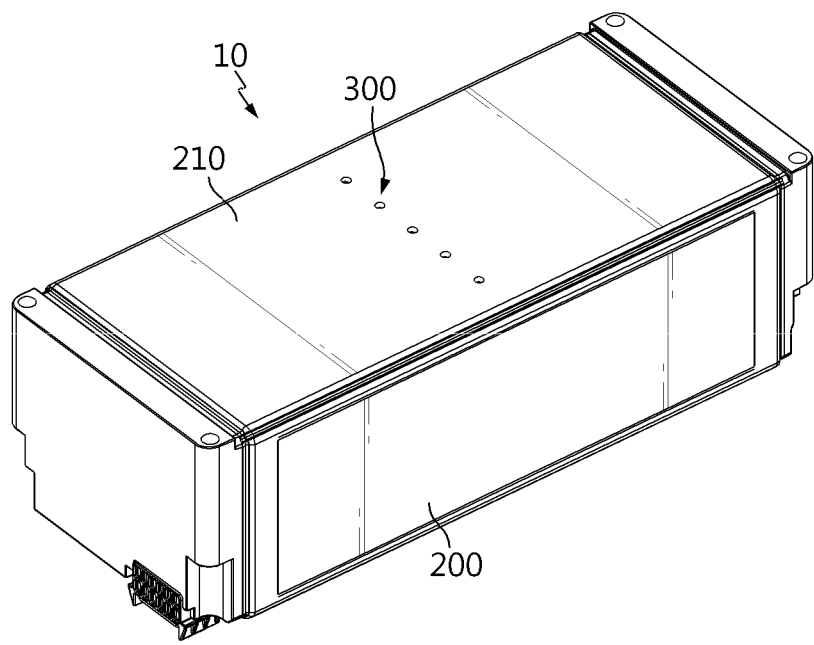
FIG. 2 is a bottom perspective view showing the battery module of FIG. 1.
Figure 3:
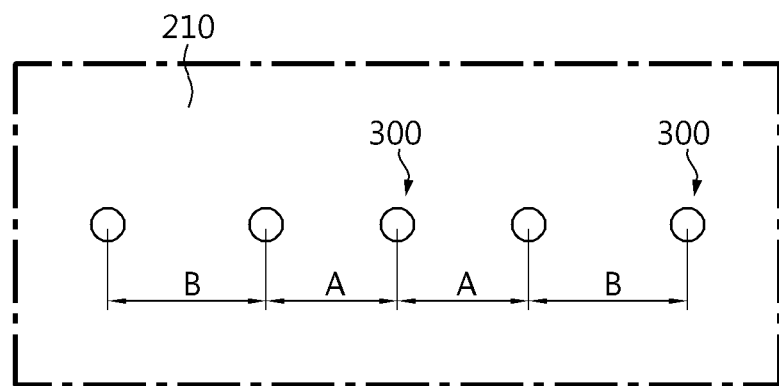
FIG. 3 is an enlarged view showing a main portion of the battery module of FIG. 2.
Figure 4:
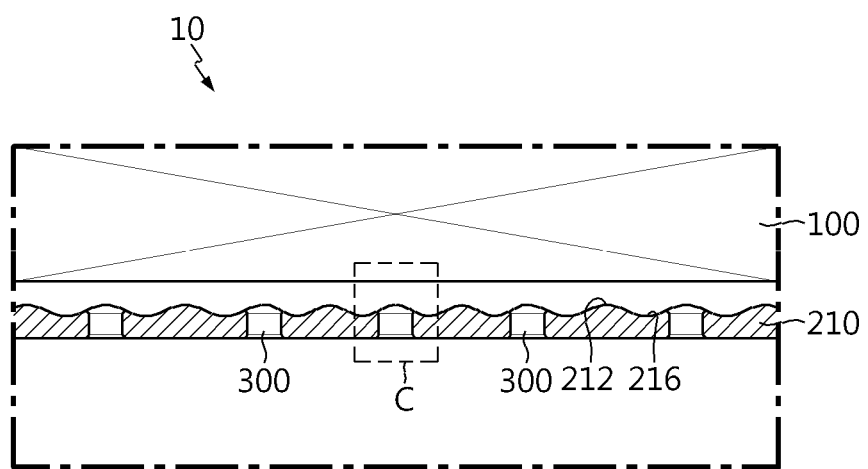
FIG. 4 is a cross-sectioned view showing a main portion of the battery module of FIG. 1.
Figure 5:
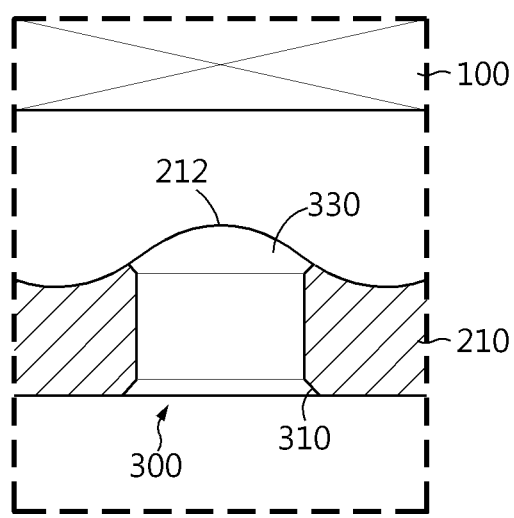
FIG. 5 is an enlarged view showing a portion C of FIG. 4.

FIG. 1 is a diagram for illustrating a battery module according to an embodiment of the present disclosure, FIG. 2 is a bottom perspective view showing the battery module of FIG. 1, FIG. 3 is an enlarged view showing a main portion of the battery module of FIG. 2, FIG. 4 is a cross-sectioned view showing a main portion of the battery module of FIG. 1, and FIG. 5 is an enlarged view showing a portion C of FIG. 4.

Referring to FIGS. 1 to 5, a battery module 10 may include a battery cell assembly 100, a module case 200 and an injection hole 300.

The battery cell assembly 100 includes at least one battery cell. Hereinafter, this embodiment will be described based on the case where a plurality of battery cells are stacked to be electrically connected to each other. Here, each battery cell may be a pouch type secondary battery.

The module case 200 is used for accommodating the battery cell assembly 100 and may have an accommodation space formed therein. A thermally conductive adhesive TR, explained later, may be coated on an inside of the module case 200, specifically on an upper side of an inner surface of the bottom portion 210 of the module case 200.

Here, convex portions 212 and concave portions 216 may be alternately formed at one side of the inner surface of the bottom portion 210 of the module case 200. Specifically, the convex portions 212 and the concave portions 216 may be provided at positions corresponding to locations where a plurality of injection holes 300, explained later, are formed.

The convex portions 212 and the concave portions 216 may be arranged to face the battery cell assembly 100 in the module case 200 and may have a rounded shape to prevent the battery cell assembly 100 from being damaged.

The injection hole 300 is provided in the bottom portion 210 of the module case 200 and may allow the thermally conductive adhesive TR to be injected into the module case 200. The thermally conductive adhesive TR is a cooling adhesive with thermal conductivity and may be a thermal resin.

The injection hole 300 may be provided in plural, and the plurality of injection holes 300 may be spaced apart from each other by a predetermined distance at the bottom portion 210 of the module case 200. In particular, the plurality of injection holes 300 may be provided in a middle region of the bottom portion 210 of the module case 200.

The plurality of injection holes 300 may be provided in a number such that the thermally conductive adhesive TR may be smoothly coated to the inside of the module case 200. For example, the number of the injection holes 300 may be three to five.

The plurality of injection holes 300 may have spacing distances that varies in an outer direction from the center of the bottom portion 210 of the module case 200. Specifically, a spacing distance A between the injection hole 300 disposed at the center of the bottom portion 210 of the module case 200 and the injection holes 300 disposed at both sides thereof and a spacing distance B between the injection holes 300 disposed at the outer side of the bottom portion of the module case 200 and the injection holes 300 disposed at a side thereof may be different from each other. This is for uniform coating of the thermally conductive adhesive TR to the inside of the module case 200, and, for example, the spacing distance B at an outer side may be greater than the spacing distance A at an inner side.

The plurality of injection holes 300 may be provided at the convex portions 212. Accordingly, the plurality of injection holes 300 may be formed in a thickest region of the bottom portion 210 of the module case 200. Thus, in this embodiment, it is possible to minimize the stiffness variation of the module case 200 due to the injection holes 300.

An inclined chamfer portion 310 may be provided at one end 310 of the plurality of injection holes 300, specifically at an end 310 exposed to the outside of the bottom portion 210 of the module case 200. The chamfer portion 310 guides an injection nozzle for injecting the thermally conductive adhesive TR to be positioned in the injection holes 300 and increases the contact area with the injection nozzle, thereby improving the sealing force when the injection nozzle is mounted.

The other end 330 of the plurality of injection holes 300, specifically an end 330 exposed to the inside of the bottom portion 210 of the module case 200, may have a rounded shape. Accordingly, in this embodiment, when the thermally conductive adhesive TR is injected, it is possible to minimize the impact applied to the battery cell assembly 100 and the module case 200 by the injected thermally conductive adhesive TR.

Hereinafter, a method for manufacturing the battery module 10 according to this embodiment will be described in detail.

Figure 6:
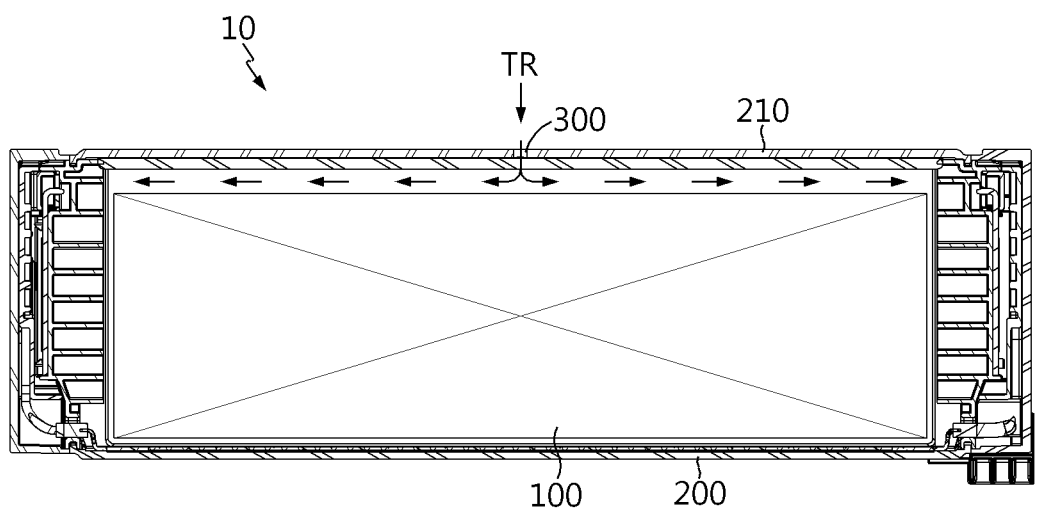
FIG. 6 is a diagram for illustrating a process of injecting a thermally conductive adhesive into the battery module of FIG. 1.

FIG. 6 is a diagram for illustrating a process of injecting a thermally conductive adhesive into the battery module of FIG. 1.

Referring to FIG. 6, when manufacturing the battery module 10, first, a worker or the like may accommodate the battery cell assembly 100 in the module case 200. Then, the worker may arrange the module case 200 horizontally before injecting the thermally conductive adhesive TR.

After that, the worker or the like may insert the injection nozzles into the plurality of injection holes 300 provided in the middle region of the bottom portion 210 of the module case 200 to coat the thermally conductive adhesive TR to the inside of the module case 200 and then inject the thermally conductive adhesive TR into the module case 200.

In this embodiment, the plurality of injection holes 300 are located in the middle region of the bottom portion 210 of the module case 200. Here, since the module case 200 is positioned horizontally and then the thermally conductive adhesive TR is injected in a direction perpendicular to the ground, the thermally conductive adhesive TR may be uniformly distributed inside the module case 200.

Figure 7:
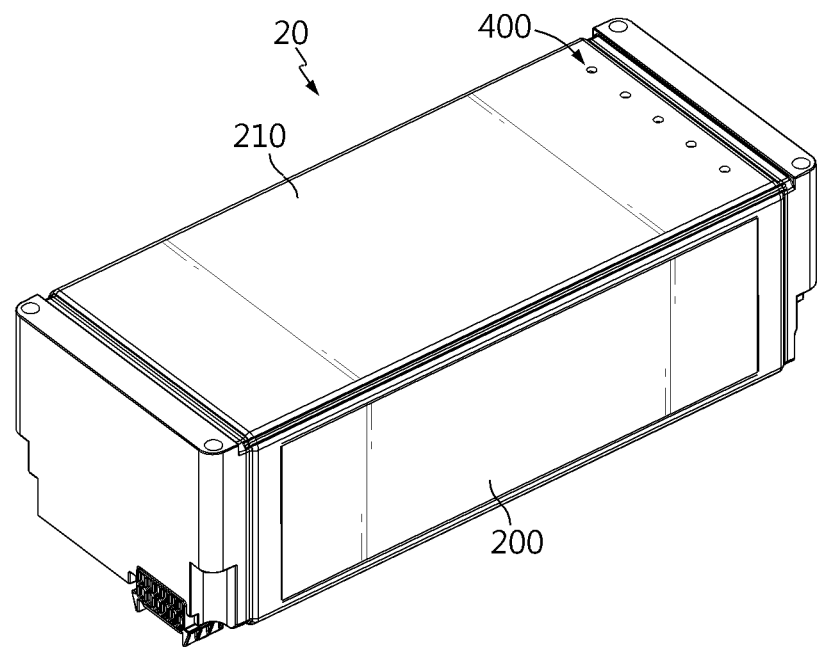
FIG. 7 is a diagram for illustrating a battery module according to another embodiment of the present disclosure.
Figure 8:
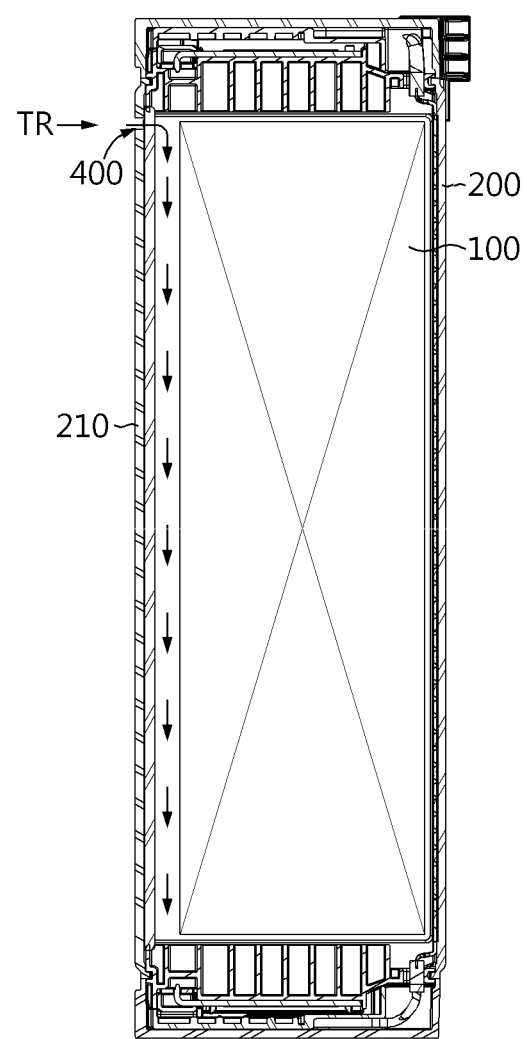
FIG. 8 is a diagram for illustrating a process of injecting a thermally conductive adhesive into the battery module of FIG. 7.

FIG. 7 is a diagram for illustrating a battery module according to another embodiment of the present disclosure, and FIG. 8 is a diagram for illustrating a process of injecting a thermally conductive adhesive into the battery module of FIG. 7.

The battery module 20 according to this embodiment is substantially identical or similar to the battery module 10 of the former embodiment, and thus the identical or similar features will not described in detail but different features will be described in detail.

Referring to FIGS. 7 and 8, the battery module 20 may include a battery cell assembly 100, a module case 200 and an injection hole 400.

The battery cell assembly 100 and the module case 200 are substantially identical or similar to those of the former embodiment and thus will be described in detail here.

The injection holes 400 may be provided in plural. The plurality of injection holes 400 may be provided at one side rim region of the bottom portion 210 of the module case 200.

Hereinafter, a method for manufacturing the battery module 20 according to this embodiment will be described in detail.

When manufacturing the battery module 20, a worker or the like may accommodate the battery cell assembly 100 in the module case 200, similar to the former embodiment. Then, the worker or the like may arrange the module case 200 vertically before injecting the thermally conductive adhesive TR.

After that, the worker or the like may insert the injection nozzles into the plurality of injection holes 400 provided at one side rim region of the bottom portion 210 of the module case 200, specifically at an upper rim region thereof, to coat the thermally conductive adhesive TR to the inside of the module case 200, and then inject the thermally conductive adhesive TR into the module case 200.

In this embodiment, the plurality of injection holes 400 are located in one side rim region of the bottom portion 210 of the module case 200. Here, since the module case 200 is positioned vertically and then the thermally conductive adhesive TR is injected in a direction horizontal to the ground, the thermally conductive adhesive TR may be uniformly distributed inside the module case 200. In other words, in this embodiment, since the thermally conductive adhesive TR is applied in a vertically descending manner by gravity, the thermally conductive adhesive TR may be uniformly distributed to the lower side of the module case 200 in a natural way.

As described above, in this embodiment, in the battery module 10, 20 that is cooled using the thermally conductive adhesive TR, it is possible to enhance the injecting efficiency of the thermally conductive adhesive TR and effectively prevent the battery cell assembly 100 and the module case 200 from being damaged.

Figure 9:
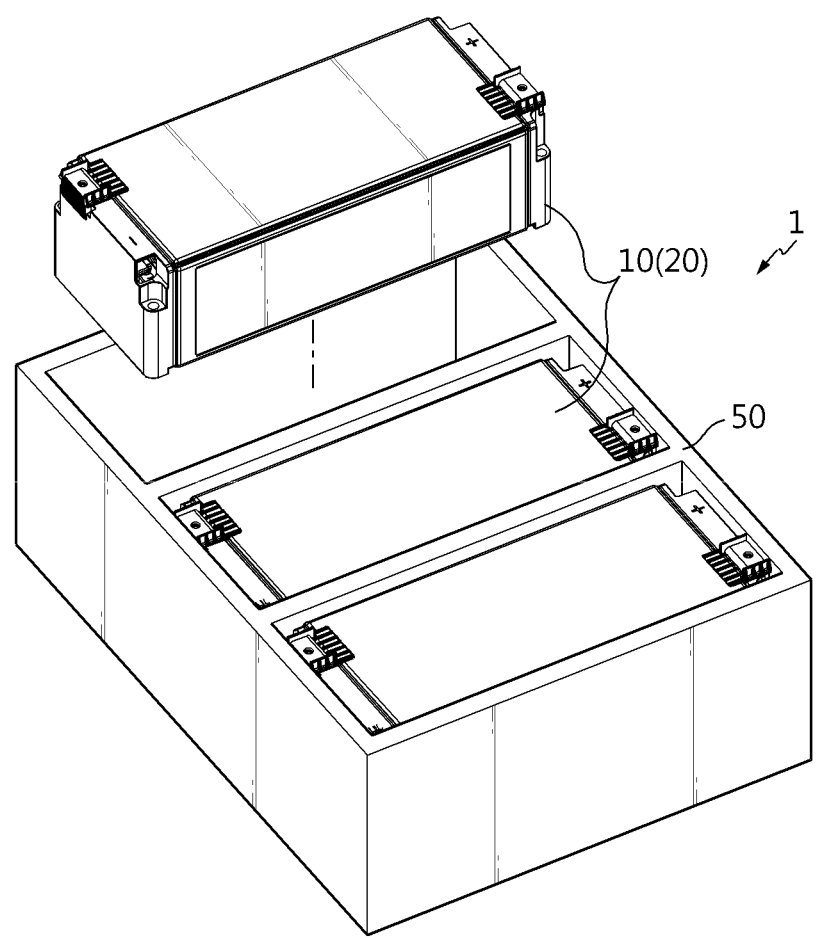
FIG. 9 is a diagram for illustrating a battery pack according to an embodiment of the present disclosure.

FIG. 9 is a diagram for illustrating a battery pack according to an embodiment of the present disclosure.

Referring to FIG. 9, a battery pack 1 may include at least one battery module 10, 20 according to the former embodiment and a pack case 50 for packaging the at least one battery module 10, 20.

The battery pack 1 may be provided to a vehicle as a fuel source of the vehicle. As an example, the battery pack 1 may be provided to an electric vehicle, a hybrid vehicle, and various other-type vehicles capable of using the battery pack 1 as a fuel source. In addition, the battery pack 1 may be provided in other devices, instruments or facilities such as an energy storage system using a secondary battery, in addition to the vehicle.

As described above, the battery pack 1 of this embodiment and devices, instruments or facilities such as a vehicle, which have the battery pack 1, include the battery module 10, 20 as described above, and thus it is possible to implement a battery pack 1 having all the advantages of the battery module 10 described above, or devices, instruments, facilities or the like such as a vehicle, which have the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
a battery cell assembly having at least one battery cell;
a module case configured to accommodate the battery cell assembly,
wherein a bottom portion of the module case has an inner surface provided with alternately formed convex portions and concave portions and a flat outer surface; and
at least one injection hole provided in the bottom portion of the module case to inject a thermally conductive adhesive into the module case,
wherein the at least one injection hole is provided at the convex portions of the bottom portion of the module case.

2. The battery module according to claim 1,
wherein the at least one injection hole is formed at a thickest region of the bottom portion of the module case.

3. The battery module according to claim 1,
wherein the at least one injection hole includes a plurality of injection holes spaced apart from each other by a predetermined distance at the bottom portion of the module case.

4. The battery module according to claim 3,
wherein the convex portions and the concave portions have a rounded shape.

5. The battery module according to claim 3,
wherein each of the plurality of injection holes has an inclined chamfer portion at one side thereof.

6. The battery module according to claim 5,
wherein the one side of each of the plurality of injection holes is exposed to an outside of the bottom portion of the module case.

7. The battery module according to claim 5,
wherein each of the plurality of injection holes has a rounded shape at another side thereof opposite to the one side.

8. The battery module according to claim 3,
wherein the plurality of injection holes have different spacing distances in an outer direction from the center of the bottom portion of the module case.

9. A battery module, comprising:
a battery cell assembly having at least one battery cell;
a module case configured to accommodate the battery cell assembly,
wherein a bottom portion of the module case has an inner surface provided with alternately formed convex portions and concave portions and a flat outer surface; and
a plurality of injection holes spaced apart from each other by a predetermined distance at the bottom portion of the module case to inject a thermally conductive adhesive into the module case,
wherein the plurality of injection holes are provided only at a middle region of the bottom portion of the module case.

10. A battery module, comprising:
a battery cell assembly having at least one battery cell;
a module case configured to accommodate the battery cell assembly,
wherein a bottom portion of the module case has an inner surface provided with alternately formed convex portions and concave portions and a flat outer surface; and
a plurality of injection holes spaced apart from each other by a predetermined distance at the bottom portion of the module case to inject a thermally conductive adhesive into the module case,
wherein the plurality of injection holes are provided only at one side rim region of the bottom portion of the module case.

11. The battery module according to claim 1,
wherein the at least one injection hole extends from the inner surface to the outer surface of the bottom portion.

12. A battery pack, comprising:
at least one battery module defined in claim 1; and
a pack case configured to package the at least one battery module.

13. A vehicle, comprising:
at least one battery pack defined in claim 12.

* * * * *